(12) United States Patent
Kozaki

(10) Patent No.: US 8,469,351 B2
(45) Date of Patent: Jun. 25, 2013

(54) SHEET CONVEYER DEVICE

(75) Inventor: Daisuke Kozaki, Kiyosu (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 13/433,342

(22) Filed: Mar. 29, 2012

(65) Prior Publication Data

US 2012/0261880 A1 Oct. 18, 2012

(30) Foreign Application Priority Data

Apr. 14, 2011 (JP) .................. 2011-089971

(51) Int. Cl.
  *B65H 5/22* (2006.01)
  *G03G 15/00* (2006.01)
(52) U.S. Cl.
  USPC .......................... 271/3.14; 399/367
(58) Field of Classification Search
  USPC .......................... 271/3.14; 399/367
  See application file for complete search history.

(56) References Cited

U.S. PATENT DOCUMENTS

| | | | | |
|---|---|---|---|---|
| 2012/0248681 A1* | 10/2012 | Kozaki et al. | ................. | 271/109 |
| 2012/0256370 A1* | 10/2012 | Kozaki | ......................... | 271/264 |

FOREIGN PATENT DOCUMENTS

| | | |
|---|---|---|
| JP | 2001-075675 A | 3/2001 |
| JP | 2002-079788 A | 3/2002 |
| JP | 2003-072191 | 3/2003 |
| JP | 2003-285500 A | 10/2003 |
| JP | 2007-118435 A | 5/2007 |

OTHER PUBLICATIONS

Pending U.S. Appl. No. 13/426,915 filed on Mar. 22, 2012.
JP Office Action mailed Apr. 23, 2013, JP Application 2011-089971, English translation.

\* cited by examiner

*Primary Examiner* — Luis A Gonzalez
(74) *Attorney, Agent, or Firm* — Banner & Witcoff, Ltd.

(57) ABSTRACT

A sheet conveyer device, including a main housing and a cover member, is provided. The cover member has a plane section made of a transparent material and is attachable to the main housing with a predetermined facing surface of the plane section set to face a predetermined plane of the main housing. An ornamental sheet can be detachably attached to the sheet conveyer device in a position between the predetermined plane and the cover member. The cover member includes an engaging piece, which is formed on a same side as the predetermined facing surface of the plane section and is engageable with an engageable section in the main housing. The engaging piece has a sheet holding rib and a clearance in between the predetermined facing surface and the sheet holding rib and holds a lateral end of the ornamental sheet in the clearance.

7 Claims, 9 Drawing Sheets

SHEET CONVEYER DEVICE

CROSS REFERENCE TO RELATED APPLICATION

This application claims priority from Japanese Patent Application No. 2011-089971, filed on Apr. 14, 2011, the entire subject matter of which is incorporated herein by reference.

BACKGROUND

1. Technical Field

An aspect of the present invention relates to a sheet conveyer device, which is capable of conveying a sheet along a predetermined sheet conveyer path, and a covering for the sheet conveyer device.

2. Related Art

An image processing apparatus, such as a printer, a facsimile machine, a scanner, and a multifunction peripheral (MFP), having a sheet conveyer device to convey a sheet along a sheet conveyer path is known. In the image processing apparatus, an image may be printed on the sheet, or an image appearing on the sheet may be read, whilst the sheet is conveyed in the sheet conveyer path by the sheet conveyer device.

Meanwhile, an image processing apparatus may have an ornamental design on an exterior covering thereof. For example, a facsimile machine having a sheet of square-formed clear resin, such as acrylic resin, fixed on top of a casing thereof, is known, and an ornamental sheet may be placed underneath the clear resin so that a user can see and enjoy images appearing on the ornamental sheet through the clear resin. Thus, the exterior appearance of the facsimile machine may be improved.

In order for the ornamental sheet to be held in the position underneath the clear resin, the ornamental sheet needs to be fixed to the position along with the clear resin sheet. Therefore, for example, the user may place the ornamental sheet in a desired position on the casing of the facsimile machine and lay the clear resin sheet over the ornamental sheet. Thereafter, the user may attach the resin sheet by a fixing means such as screws at four corners of the sheet.

SUMMARY

When the user attempts to fix the resin sheet on the casing of the facsimile machine by the screws with the ornamental sheet underneath the clear resin sheet, however, the ornamental sheet may undesirably slip on the casing. Accordingly, by the time when the user finishes screwing, the ornamental sheet may be in a different position underneath the clear resin sheet from the initially desired position. Thus, the user may repeat the screwing all over again.

Further, when the clear resin sheet is screwed to screw holes at the four corners, it is desirable that the ornamental sheet is placed in a non-interfering position, in which the ornamental sheet is not laid over the screw holes, in order to avoid the screws from being interfered with by the ornamental sheet or to avoid the ornamental sheet from being damaged by the screws. Thus, a size of the ornamental sheet may be restricted by the screws to be smaller than an entire size of the clear resin sheet, and the entire size of the clear resin sheet may not be enjoyed.

Furthermore, when the user wishes to replace the ornamental sheet with a new ornamental sheet, the screws are required to be removed in order to remove the clear resin sheet. And when the new ornamental sheet is placed in a desired position, the screws are required to be fastened in the positions all over again. Thus, replacement of the ornamental sheet can be cumbersome.

In view of the inconvenience, the present invention is advantageous in that a sheet conveyer device, which conveys a sheet along a conveyer path, and with which the ornamental sheet may be held in a preferred position in an easier procedure, whilst a larger exterior area on the casing may be decorated by the ornamental sheet, is provided.

According to an aspect of the present invention, a sheet conveyer device is provided. The sheet conveyer device includes a main housing configured to accommodate a sheet conveyer unit, the sheet conveyer unit being configured to convey a sheet along a predetermined conveyer path, and a cover member, which is formed to have a plane section; is configured to be detachably attached to the main housing with a predetermined facing surface of the plane section set to face a predetermined plane of the main housing; and is configured to have an ornamental sheet detachably attached in an intervening position between the predetermined plane of the main housing and the cover member. The cover member includes an engaging piece, which is formed on a same side as the predetermined facing surface of the plane section, when the cover member is attached to the main housing, and is configured to be engageable with an engageable section formed on the predetermined plane of the main housing. The engaging piece is formed to have a sheet holding rib, which is configured to form a clearance in between the predetermined facing surface of the plane section and the sheet holding rib and is configured to hold a lateral end of the ornamental sheet in the clearance.

According to another aspect of the present invention, an image processing apparatus including an image processing unit and a sheet conveyer device is provided. The sheet conveyer device includes a main housing configured to accommodate a sheet conveyer unit, which is configured to convey a sheet along a predetermined conveyer path, and a cover member, which is formed to have a plane section; is configured to be detachably attached to the main housing with a predetermined facing surface of the plane section set to face a predetermined plane of the main housing; and is configured to have an ornamental sheet detachably attached in an intervening position between the predetermined plane of the main housing and the cover member. The cover member includes an engaging piece, which is formed on a same side as the predetermined facing surface of the plane section, when the cover member is attached to the main housing, and is configured to be engageable with an engageable section formed on the predetermined plane of the main housing. The engaging piece is formed to have a sheet holding rib, which is configured to form a clearance in between the predetermined facing surface of the plane section and the sheet holding rib and is configured to hold an end portion of the ornamental sheet in the clearance.

BRIEF DESCRIPTION OF THE ACCOMPANYING DRAWINGS

DETAILED DESCRIPTION

Hereinafter, an MFP 1 with a sheet conveyer unit 60 according to an embodiment of the present invention will be described with reference to the accompanying drawings.

In the present embodiment described below, directions concerning the MFP 1 will be referred to based on a user's position to ordinary use the MFP 1 and as indicated by arrows shown in FIGS. 1, 3, 4, and 10. Therefore, according to FIG. 1, for example, a viewer's lower-left side is referred to as the user's front, and a viewer's upper-right side is referred to as the user's rear. A viewer's upper-left side is referred to as the user's left, and a viewer's lower-right side is referred to as the user's right. Further, the user's front-rear direction of the MFP 1 may also be referred to as a direction of depth, and the user's lateral (right-left) direction of the MFP 1 may also be referred to as a widthwise direction. The up-down direction appearing in FIG. 1 may also be referred to as a vertical direction.

Figure 1:
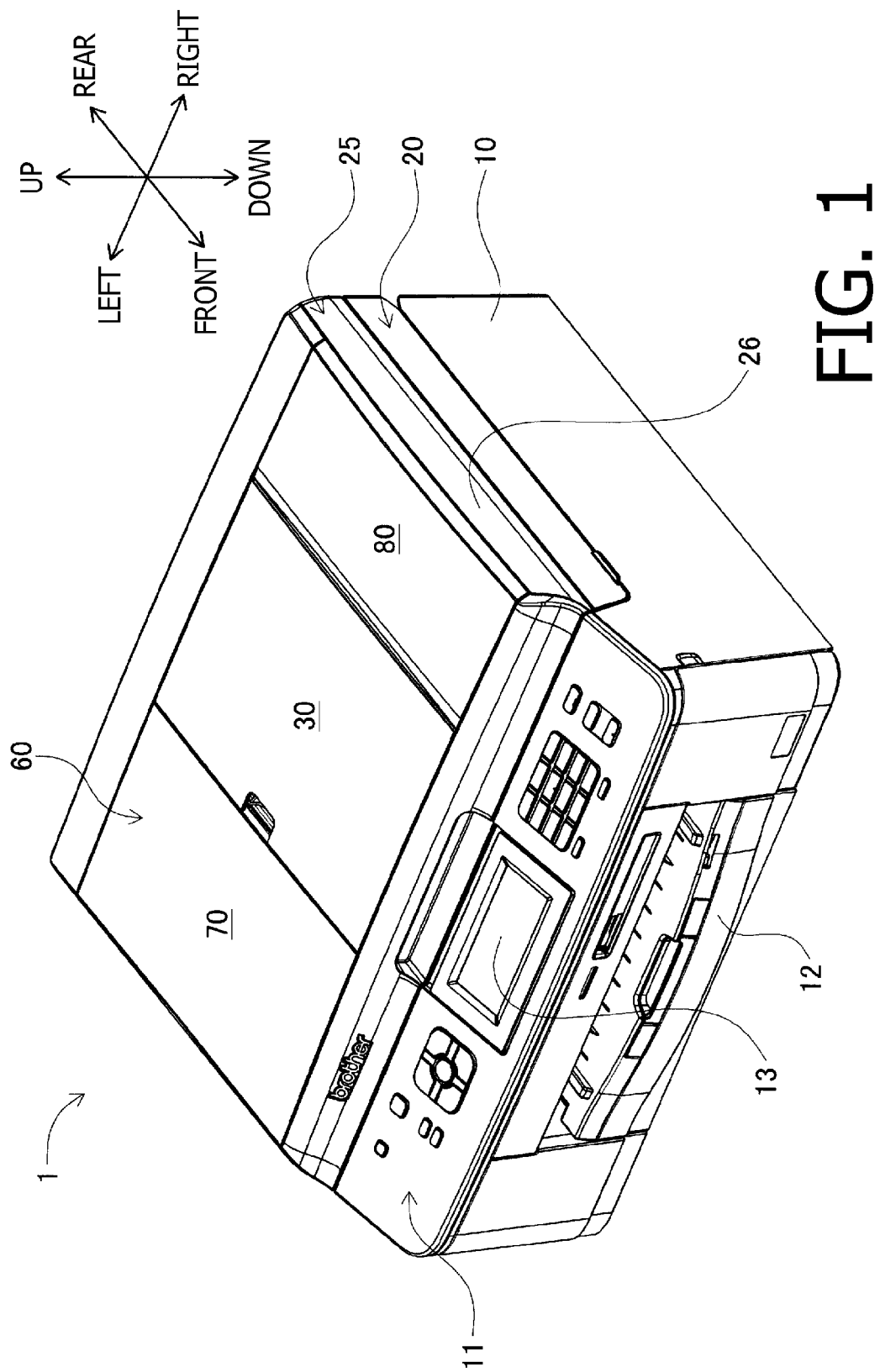
FIG. 1 is a perspective external view of an MFP according to an embodiment of the present invention.

As shown in FIG. 1, the MFP 1 has a body housing 10 and a sheet cover unit 25. The body housing 10 accommodates components and modules, which are operated to enable multiple functions (e.g., a scanning function, a facsimile transmission/receiving function, and a printing function.) provided in the MFP 1.

The body housing 10 is provided with an operation panel 11, which includes a plurality of operation keys (unsigned), and a liquid crystal display (LCD) 13, which displays various kinds of information concerning the MFP 1, on an upper-front surface thereof. The operation panel 11 is touched and operated by the user to enter instructions and information concerning behaviors of the MFP 1. Through a front face of the body housing 10, a sheet-feed cassette 12 is removably installed in the MFP 1. The sheet-feed cassette 12 contains recording sheets being recording media therein in a stack.

The body housing 10 has a scanner unit 20 (see FIGS. 1 and 2), which can read an original image formed on an original sheet, on an upper section thereof. The scanner unit 20 includes a contact glass 21, an image sensor 22, a slider shaft (unsigned), and a motor (not shown). The contact glass 21 is a horizontally arranged platen glass, on which the original sheet with the original image can be placed, and is formed to have a rectangular shape, of which longer sides are aligned along the widthwise direction. The rectangular shape of the contact glass 21 may have a size, for example, which is close to or substantially larger than a letter size.

The image sensor 22 is a contact image sensor (CIS), which can read the original image on the original sheet being placed on the contact glass 21. A readable range for the image sensor 22 is equivalent to a dimension of the shorter sides of the letter size.

The image sensor 22 is formed to have a readable range, which is equivalent to a dimension of the shorter sides of the letter size, along a main scanning direction (e.g., the direction of depth in the MFP 1). Further, the image sensor 22 is slidably movable along the slider shaft, which extends along the widthwise direction, within a predetermined widthwise slidable range. The widthwise slidable range for the image sensor 22 is equivalent to a dimension of the longer sides of the letter size. Thus, the MFP 1 manipulates the motor and slidably moves the image sensor 22 along the slider shaft to read the original image from the original sheet, which is placed on the contact glass 21.

The MFP 1 has a controller (not shown), which includes a CPU, a ROM, and a RAM, to control operations in the MFP 1. The controller is connected with the operation panel 11, and the user's input through the operation panel 11 is transmitted to the controller. Thus, the instructions and information inputted by the user can be transmitted and processed in the controller. Further, the controller manipulates the LCD 13 according to the information from the user and calculation executed in the controller to present the information concerning the operations in the MFP 1 to the user.

The MFP 1 has a facsimile transmission/receiver unit (not shown), which transmits image data created based on the original image read by the scanner unit 20 to an external facsimile machine through a network (not shown). Further, the facsimile transmission/receiver unit receives image data transmitted from an external facsimile machine through the network. The received image data can be processed in an image forming unit (not shown) to be printed on the recording sheet.

The image forming unit can be manipulated by the controller to print an image on the sheet being conveyed from the sheet-feed cassette 12 according to inputted image data. The image data may be created based on the original image read by the scanner unit 20. Therefore, when the controller manipulates the image forming unit to print the image based on the image data created based on the original image, which is read by the scanner unit 20, the original image is duplicated in a copy. In other words, the MFP 1 can serve as a copier. Further, the image forming unit may print an image based on externally inputted image data, which is inputted through the network. In other words, the MFP 1 can serve as a printer.

The sheet cover unit 25 of the MFP 1 will be described hereinbelow. The sheet cover unit 25 is rotatable about a rear edge of a top plane of the body housing 10 to be openable and closable with respect to the body housing 10. When the sheet cover unit 25 is in a closed position (see FIG. 2), the contact glass 21 on the top plane of the body housing 10 is covered. Therefore, when the sheet cover unit 25 is in the closed position, the sheet cover unit 25 can hold the original sheet in place on the contact glass 21.

Figure 2:
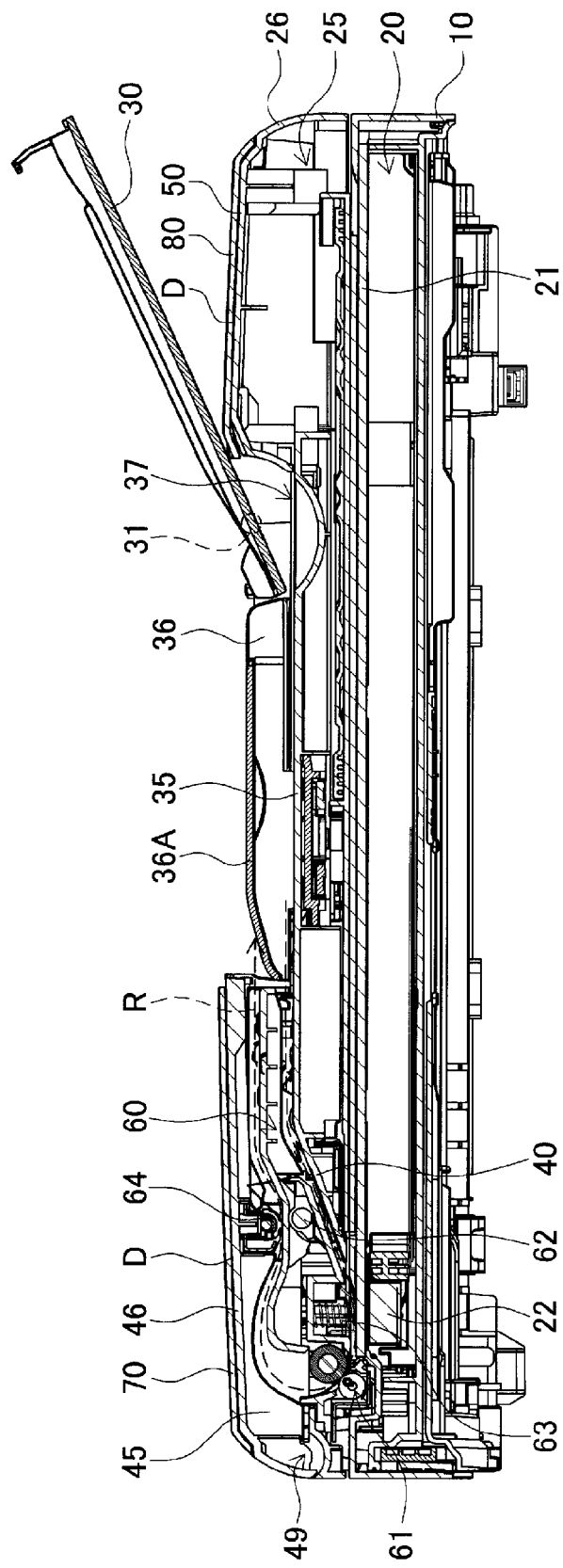
FIG. 2 is a cross-sectional side view of a cover unit in the MFP according to the embodiment of the present invention.

The sheet cover unit 25 has a sheet cover housing 26, which includes a cover tray 30, a sheet guiding plane 35, a conveyer housing 40, and an upper cover 45 (see FIGS. 1 and 2). The sheet conveyer unit 60 is an auto document feeder (ADF) and is arranged on a left side of the sheet cover unit 25.

Figure 11:
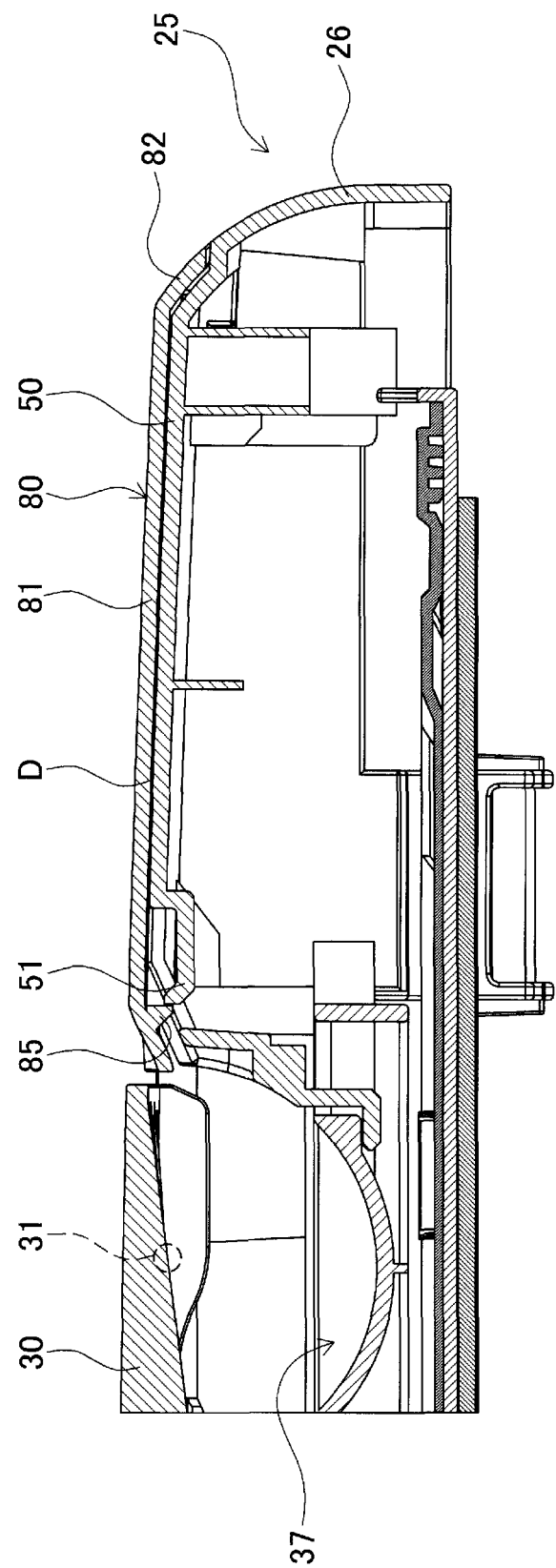
FIG. 11 is a cross-sectional view of the second top cover in the MFP according to the embodiment of the present invention with a cover tray in a closed position.
Figure 12:
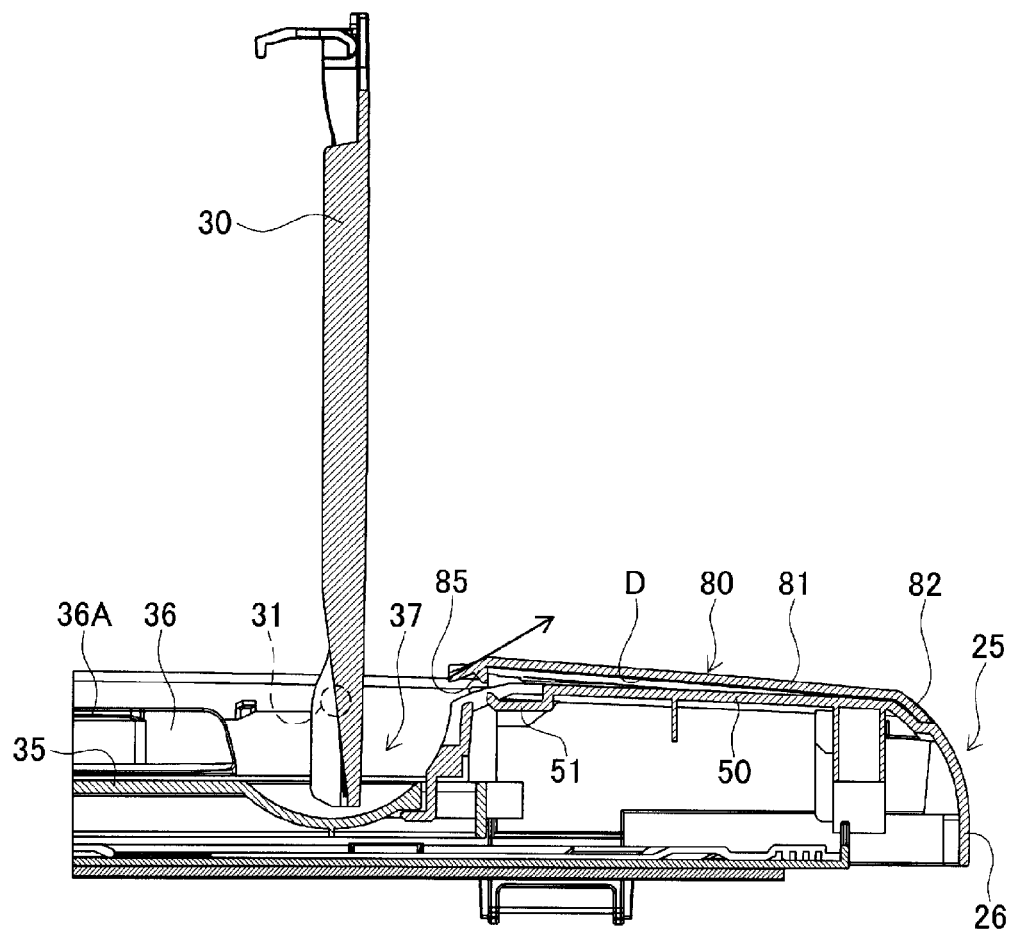
FIG. 12 is a cross-sectional view of the second top cover in the MFP according to the embodiment of the present invention with the cover tray in an open position.

The cover tray 30 is formed in an upper central position in the sheet cover unit 25 and is arranged to be rotatable about a tray shaft 31, which is arranged on a right-side area of the cover tray 30 (see also FIGS. 11 and 12). When the cover tray 30 is in a closed position (see FIG. 1), the cover tray 30 is laid horizontally to form an upper surface of the sheet cover unit 25 in a same plane as a first top cover 70 and a second top cover 80, which will be described later in detail.

In the present embodiment, an exterior (a top) surface of the sheet cover unit 25 when the cover tray 30 is in the closed position is referred to as a first tray surface, and an inner surface on an opposite side from the first tray surface will be referred to as a second tray surface.

When the cover tray 30 is rotated about the tray shaft 31 for a predetermined amount, the cover tray 30 is placed in an open and usable position (see FIG. 2). When in the usable position, the cover tray 30 is in a downwardly inclined posture toward the sheet conveyer unit 60 and has the second tray surface upward. When the cover tray 30 is in the usable position, original sheets with original images may be placed in a stack on the second tray surface of the cover tray 30. Thus, the cover tray 30 in the usable position can serve as a sheet-feed tray for the original sheets.

The sheet guiding plane 35 and a pair of sheet guiding members 36 are arranged in a lower position with respect to the cover tray 30, when the cover tray 30 is in the closed position. The sheet guiding plane 35 and the sheet guide members 36 are exposed when the cover tray 30 is in the usable position.

The sheet guiding plane 35 is formed to extend along a sheet conveyer path R (see FIG. 2), which is formed in a lower position with respect to the sheet conveyer unit 60 in the conveyer housing 40, and is arranged in a position to extend continuously from the cover tray 30 in the usable position. In this position, the sheet guiding plane 35 guides the original sheets placed on the second tray surface of the cover tray 30 to the sheet conveyer path R in the sheet conveyer unit 60.

The sheet guiding members 36 are arranged on the sheet guiding plane 35 and are slidable in the direction of depth. The sheet guiding members 36 are movable in opposite directions from each other along the direction of depth in cooperation with each other. Therefore, in order for clearance between the sheet guiding members 36 to be narrowed or widened, the user may move solely one of the sheet guiding members 36 toward or to be away from the other of the sheet guiding members 36. Thus, the original sheets may be set in the clearance between the sheet guiding members 36 and may be prevented from being in a skew orientation with respect to a sheet conveying direction, i.e., the sheet conveyer path R.

Each of the sheet guiding members 36 is formed to have a separator 36A. The separator 36A of the sheet guiding members 36 is, at least in a part, arranged to be vertically spaced apart from the sheet guiding plane 35.

In a lower position with respect to the tray shaft 31 of the cover tray 30 in the sheet cover unit 25, a downward concave section 37 is formed (see FIGS. 2, 11, and 12). The concave section 37 provides a room for the cover tray 30 to rotate about the tray shaft 31. More specifically, in the concave section 37, a left-side end portion of the cover tray 30 being in the usable position, or a right-side end portion of the cover tray 30 being in the closed position with respect to the tray shaft 31, is allowed to rotate when the cover tray 30 is rotated about the tray shaft 31. With the concave section 37, the sheet guiding plane 35 and the tray shaft 31 of the cover tray 30 may be arranged in vertically closer positions to each other in the sheet cover unit 25 than the sheet guiding plane 35 and the tray shaft 31 without the concave section 37. Thus, the sheet cover unit 25 may be effectively downsized in height.

As mentioned above, the main components of the sheet conveyer unit 60 to convey the original sheets are disposed on the left-side section in the sheet cover unit 25. The sheet conveyer unit 60 feeds the original sheets placed on the second tray surface sheet-by-sheet continuously to convey in the sheet conveyer path R. The images appearing on the original sheets may be read by the scanner unit 20 as the original sheets are conveyed in the sheet conveyer path R by the sheet conveyer unit 60.

The sheet conveyer path R originates from the second tray surface of the cover tray 30 and extends approximately in the widthwise direction of the sheet conveyer unit 60, and turned in a shape of a 90-degrees rotated "U" in a cross section, along an upper surface of the sheet guiding surface 35 to an upper surfaces of the separators 36A of the sheet guiding members 36. In the present embodiment, a direction from the upper surface of the sheet guiding plane 35 toward the separators 36A along the U-curved sheet conveyer path R is referred to as a sheet conveying direction.

Figure 8:
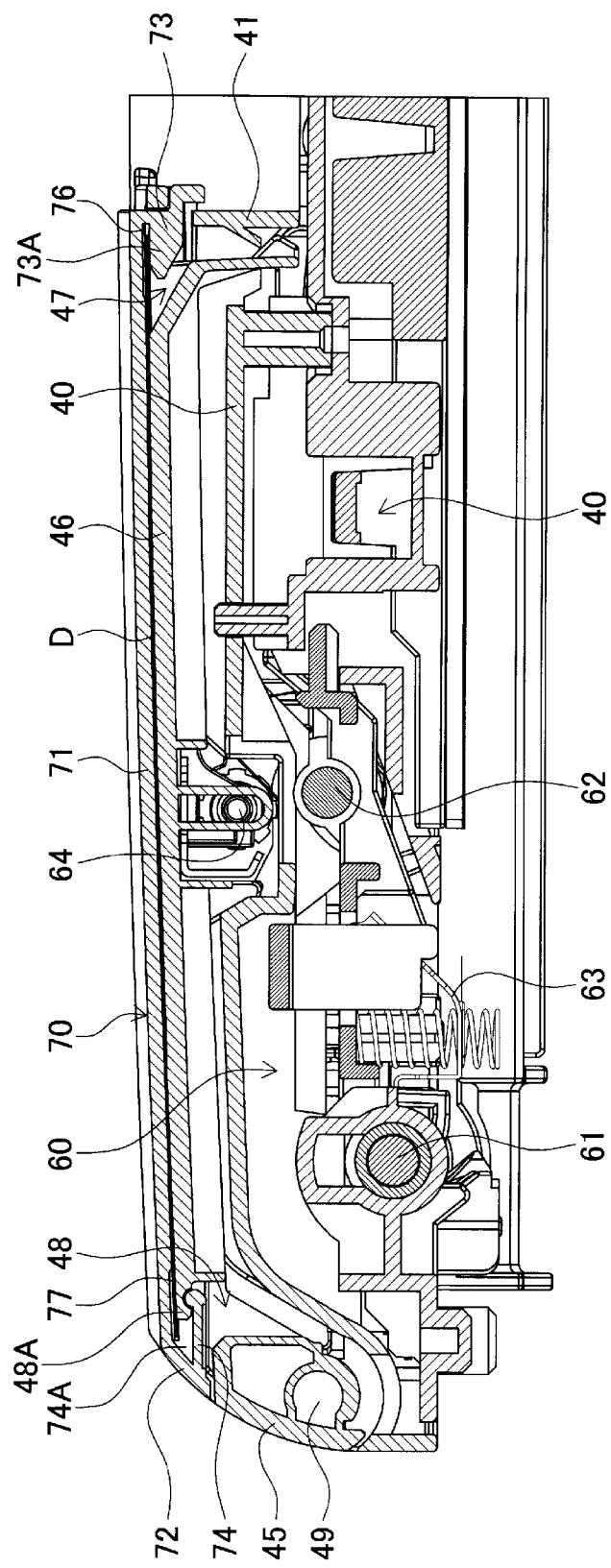
FIG. 8 is a cross-sectional view of the first top cover in a closed position in the MFP according to the embodiment of the present invention.
Figure 9:
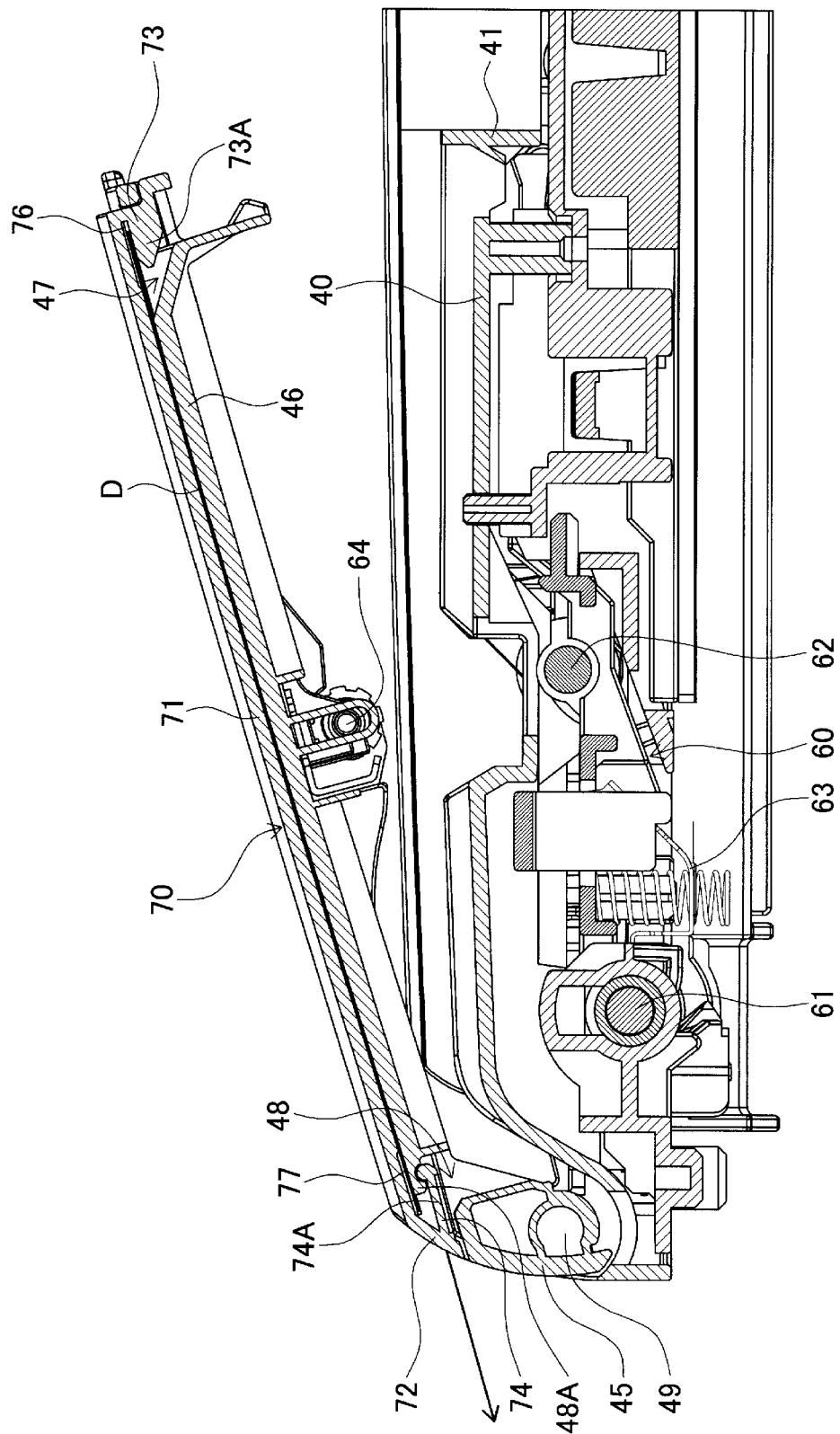
FIG. 9 is a cross-sectional view of the first top cover being open in the MFP according to the embodiment of the present invention.

The conveyer housing 40 and the upper cover 45 are arranged in the left-side positions in the sheet cover unit 25 (see FIGS. 2, 8, and 9). The conveyer housing 40 serves as a part of the sheet cover housing 26 and provides accommodation to the main components of the sheet conveyer unit 60, including conveyer roller pair 61 and a driving conveyer roller 62. Thus, the conveyer housing 40 is included as a main part of the sheet conveyer unit 60. The conveyer housing 40 contains a part of the sheet conveyer path R, which extends from the sheet guiding plane 35. The sheet conveyer path R is directed to reach an upper surface of the conveyer housing 40.

The upper cover 45 being a part of the sheet cover housing 26 is pivotably attached to the upper surface of the conveyer housing 40 to be pivotable about a pivot axis 49, which is arranged on a left-side end of the conveyer housing 40. Therefore, the upper cover 45 is openable and closable with respect to the upper surface of the conveyer housing 40 (see FIGS. 8 and 9). A lower (inner) surface of the upper cover 45 defines a part of the sheet conveyer path R along with the upper surface of the conveyer housing 40. Thus, the part of the sheet conveyer path R extending from the sheet guiding plane 35 in the conveyer housing 40 is continuously extended to the sheet conveyer path R formed in between the lower surface of the upper cover 45 and the upper surface of the conveyer housing 40. The sheet conveyer path R is further extended to the separators 36A of the sheet guiding members 36.

On an upper surface of the upper cover 45, a first top cover 70 and an ornamental sheet D can be removably attached. The upper surface of the upper cover 45 will be referred to as a first top cover attachable surface 46. Attachment of the first top cover 70 and the ornamental sheet D to the upper cover 45 will be described later in detail.

On a right-side section in the sheet cover unit 25, a second top cover attachable surface 50 is formed (see FIG. 2). The second top cover attachable surface 50 forms a top plane of the sheet cover housing 26, and a second top cover 80 and an ornamental sheet D can be removably attached thereto. Attachment of the second top cover 80 and the ornamental sheet D to the second top cover attachable surface 50 will be described later in detail.

The sheet conveyer unit 60 in the MFP 1 will be described hereinbelow. The sheet conveyer unit 60 to convey the original sheets along the sheet conveyer path R includes the conveyer roller pair 61, the driving conveyer roller 62, a sheet presser 63, and a driven conveyer roller 64.

Figure 4:
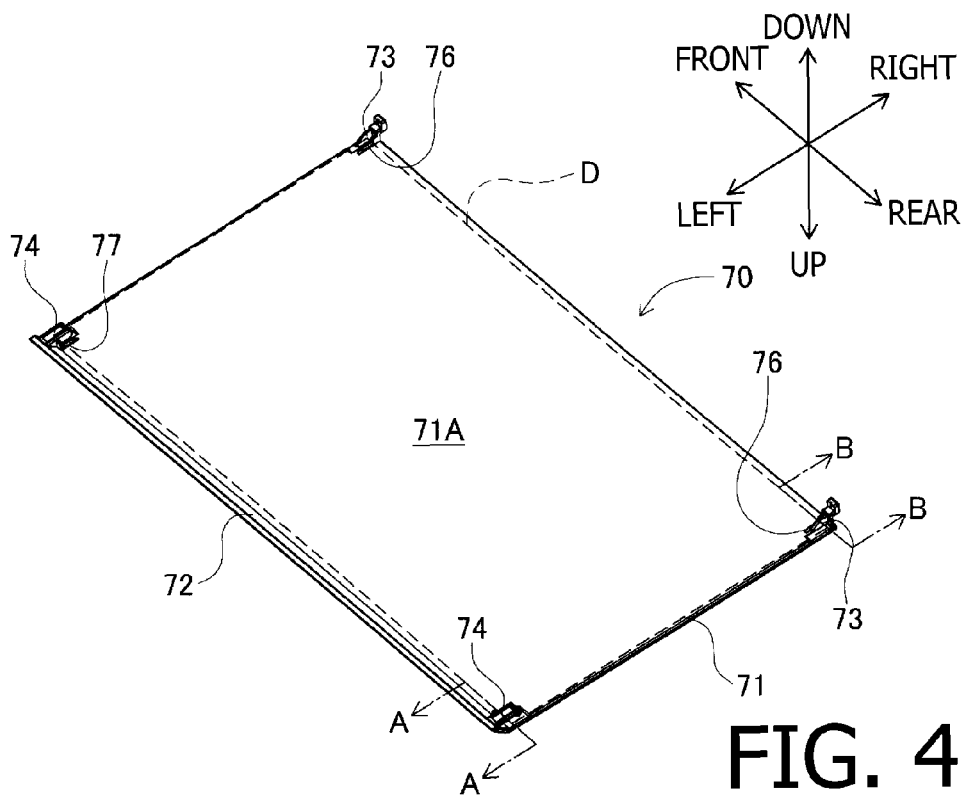
FIG. 4 is a perspective view of a first top cover in the MFP according to the embodiment of the present invention.
Figure 7:
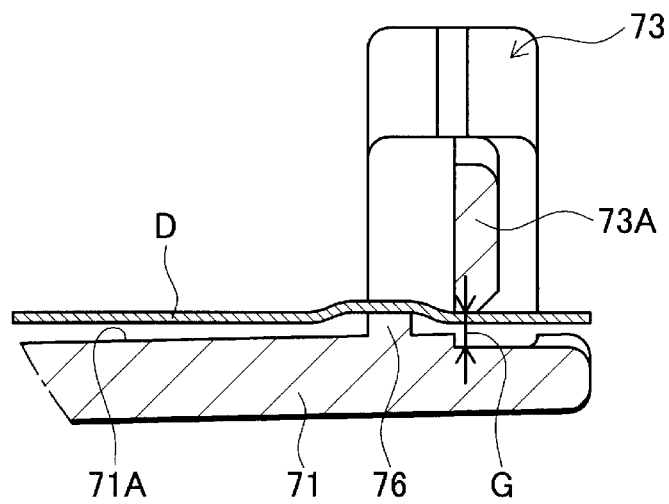
FIG. 7 is a cross-sectional view of an area surrounding a first projection in the MFP according to the embodiment of the present invention.

The conveyer roller pair 61 includes a pair of rollers, which are arranged in positions to face each other across the sheet conveyer path R (see FIGS. 4, 7, and 8). The pair of conveyer rollers 61 is rotated under control of the controller, and as the pair of conveyer rollers 61 rotates, the original sheet nipped between the conveyer rollers 61 is conveyed along the sheet conveyer path R.

The conveyer driving roller 62 is arranged along the upper surface of the conveyer housing 40 and rotatable thereat. As the conveyer driving roller 62 rotates, the original sheet reaching the upper surface of the conveyer housing 40 in the sheet conveyer path R is forwarded toward the upper surfaces of the separators 36A of the sheet guiding members 36.

The sheet presser 63 is arranged in an upstream position with respect to the conveyer roller pair 61 along the sheet conveying direction and presses the original sheet in the sheet conveyer path R toward the contact glass 21. As shown in FIG. 2, the image sensor 22 to read the image on the original sheet is disposed in a lower position with respect to the sheet presser 63. Therefore, with the sheet presser 63 pressing the original sheet toward to the contact glass 21, the image formed on the original sheet may be read by the image sensor 22 through the contact glass 21 steadily and clearly.

The conveyer driven roller 64 is arranged on an inner side of the upper cover 45 and is rotatable thereat. The conveyer driven roller 64 faces the conveyer driving roller 62 across the sheet conveyer path R when the upper cover 45 is in a closed position with respect to the upper surface of the conveyer housing 40 (see FIGS. 2 and 8). Thus, the conveyer driven roller 64 can convey the original sheet in the sheet conveyer path R in cooperation with the conveyer driving roller 62 toward the upper surfaces of the separators 36A of the sheet guiding member 36.

The upper cover 45 will be described in detail hereinbelow. The upper cover 45 is attached to the conveyer housing 40 in the left-side section in the sheet cover unit 25 and is openable and closable with respect to the conveyer housing 40. The upper cover 45 includes the first top cover attachable surface 46 and the pivot axis 49 (see FIG. 3). The pivot axis 49 extends linearly along the direction of depth at a left-side end of the upper cover 45 and supports the upper cover 45 rotatably with respect to the conveyer housing 40.

Figure 3:
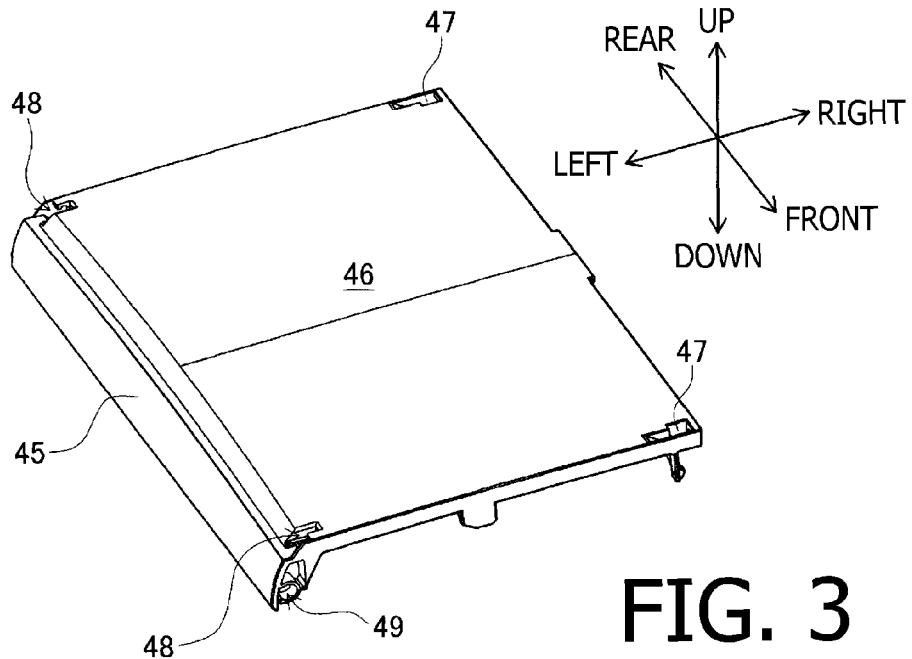
FIG. 3 is a perspective view of an upper cover in the cover unit according to the embodiment of the present invention.

The first top cover attachable surface 46 is a plane area on an upper left surface of the sheet cover housing 26 and is formed to have first slider holes 47 and first engageable holes 48 (see FIG. 3). On the first top cover attachable surface 46, the first top cover 70 along with the ornamental sheet D can be detachably attached.

The first slider holes 47 are formed in right-side corners on the first top cover attachable surface 46 respectively. Each of the first slider holes 47 has a shape of rectangle, in a plane view, of which longer sides align along the widthwise direction. When the first top cover 70 is attached to the first top cover attachable surface 46, first claws 73 (see FIG. 4) formed on the first top cover 70 are slidably inserted in the first slider holes 47 (see also FIGS. 3, 8, and 9). In particular, each first slider hole 47 is formed to have an inclined plane, which extends rightward and downwardly from a left-side edge of the first slider hole 47 toward the conveyer housing 40. When the first top cover 70 is being attached to the first top cover attachable surface 46, the first claws 73 are slidably moved along the inclined planes until the first claws 73 penetrates the first top cover attachable surface 46 via the first slider holes 47. When the first top cover 70 is being removed from the first top cover attachable surface 46, the first claws 73 are slidably moved in a reverse direction along the inclined planes in the first slider holes 47.

The first engageable holes 48, on the other hand, are formed in left-side corners on the first top cover attachable surface 46 respectively. When the first top cover 70 is being attached to the first top cover attachable surface 46, the first engageable holes 48 are engaged with first slide-engaging claws 74 (see FIG. 4), which are formed on the first top cover 70. Thus, the first top cover 70 can be removably attached to the first top cover attachable surface 46 (see also FIGS. 3, 8, and 9). The first engageable holes 48 are formed to recess downward from the first top cover attachable surface 46. In particular, each first engageable hole 48 is formed to have a first engageable edge 48A, which extends from the first top cover attachable surface 46 in the widthwise direction, and a lower surface of the first engageable edge 48A is partially concaved upwardly. Further, the first engageable hole 48 has a hole section (unsigned), which is formed in a lower position with respect to the first engageable edge 48A and which provides a space for the first slide-engaging claw 74 to be slidably movable in the widthwise direction therein (see FIGS. 8 and 9).

The first top cover 70 will be described hereinbelow. The first top cover 70 is made of a transparent and colorless resin and is detachably attached to the first top cover attachable surface 46 on the upper cover 45. The first top cover 70 is formed to have a plane section 71, a lateral face 72, the first claws 73, and the first slide-engaging claws 74 (see FIG. 4). The first top cover 70 can hold the ornamental sheet D in an intervening position between the first top cover attachable surface 46 and a facing (lower) surface 71A of the plane section 71.

The plane section 71 is formed in a shape, which is substantially similar and equivalent in size to the first top cover attachable surface 46 of the upper cover 45. The plane section 71 has a lower surface being the facing surface 71A, which can face the first top cover attachable surface 46 when the first top cover 70 is attached to the upper cover 45 (when the ornamental sheet D is placed in position, via the ornamental sheet D). The lateral face 72 extends from a left-side end of the plane section 71 down-and-leftward in a direction to be distanced apart from the facing surface 71A of the plane section 71 toward the conveyer casing 40. The ornamental sheet D can be held on the facing surface 71A by the first claws 73 and the first slide-engaging claws 74. On the facing surface 71A of the first top cover 70, a projection 76 projecting downward (toward the first top cover attachable surface 46 when the first top cover 70 is attached to the upper cover 45) is formed in a position to align each first claw 73 (see FIGS. 4 and 7). Further, a projection 77 projecting downward (toward the first top cover attachable surface 46 when the first top cover 70 is attached to the first top cover attachable surface 46) is formed in a position to align each first slide-engaging claw 74 (see FIGS. 4-6).

The first claws 73 are formed to protrude downward, when the first top cover 70 is attached to the upper cover 45, at the right-side corners on the plane section 71. Each of the first claws 73 is slidably inserted in the first slider hole 47 along the longer sides of the first slider hole 47 to penetrate the first top cover attachable surface 46. Thus, the first claw 73 can removably hold onto the first top cover 70 in a predetermined position on the first top cover attachable surface 46 in cooperation with the first slider hole 47 formed in the first top cover attachable surface 46. When the first top cover 70 is fully attached to the first top cover attachable surface 46, the first claw 73 protrudes downward to a position lower than the first top cover attachable surface 46 (see FIGS. 8 and 9).

The first claw 73 is formed to have a sheet holding rib 73A (see FIG. 7), which extends along the facing surface 71A. FIG. 7 shows a cross-section of the first claw 73 and the projection 76 on the top cover 70, taken along the line B-B in FIG. 4. The first claw 73 is formed to have the sheet holding rib 73A in a position and a shape to create a clearance G, which is open on the left side and closed on the right side, along with the facing surface 71A (see FIGS. 8 and 9). In the clearance G formed in between the sheet holding rib 73A and the facing surface 71A, a right-side end of the ornamental sheet D can be inserted. Thus, the ornamental sheet D can be held in the position by the facing surface 71A and the sheet holding rib 73A along the facing surface 71A with the right-side end thereof being inserted in the clearance G.

Meanwhile, the projection 76 is formed in the position along the sheet holding rib 73A of the first claw 73 on the facing surface 71A (see FIG. 7). In particular, the projection 76 is formed to protrude downward (when the top cover 70 is attached to the upper cover 45) in a position to be spaced apart for a predetermined distance from the sheet holding rib 73A along a plane, which is in parallel with the facing surface 71A. In the meantime, the projection 76 is extended downwardly to have an open end (i.e., a lower end) thereof to reach a lower position, which is vertically (i.e., along an orthogonal direction with respect to the facing surface 71A) spaced apart further from the facing surface 71A, than an upper end of the sheet holding rib 73A when the top cover is attached to the upper cover 45. In other words, when viewed along the direction of depth (i.e., the front-rear direction), the projection 76 and the sheet holding rib 73A partially overlap each other horizontally. Therefore, when the ornamental sheet D is being inserted in the clearance G between the sheet holding rib 73A and the facing surface 71A, the ornamental sheet D is forwarded along the facing surface 71A passing by the lower end of the projection 76, through the space between the projection 76 and the sheet holding rib 73A, and by the upper end of the sheet holding rib 73A, with the right-side edge of the ornamental sheet D being deformed by the lower open end of the projection 76 and the upper end of the sheet holding rib 73A (see FIG. 7). When thus the ornamental sheet D is inserted in the clearance G, with the resilient nature thereof, the ornamental sheet D is urged against the lower end of the projection 76 and the upper end of the sheet holding rib 73A. Therefore, the ornamental sheet D can be held in position on the first top cover 70 more steadily by the cooperation of the projection 76 and the sheet holding rib 73A.

The first slide-engaging claw 74 is formed in a front end position and a rear end position respectively on the lateral face 72. The first slide-engaging claw 74 is formed to extend rightward from the lateral face 72 along the plane section 71 (see FIGS. 8 and 9) with a predetermined amount of distance maintained from the plane section 71 and has an upward convex (unsigned) in a rightward-extended tip end thereof. When the first top cover 70 is being attached to the upper cover 45, the first slide-engaging claw 74 is inserted in the first engageable hole 48 along with the sliding movement of the first top cover 70. When the first top cover 70 is moved to a predetermined position, the convex in the first slide-engaging claw 74 fits in the upward concave in the first engageable edge 48A in the first engageable hole 48. Thus, the first slide-engaging claw 74 is engaged with the first engageable hole 48, and the first top cover 70 is detachably attached to the upper cover 45 on the first top cover attachable surface 46.

Figure 5:
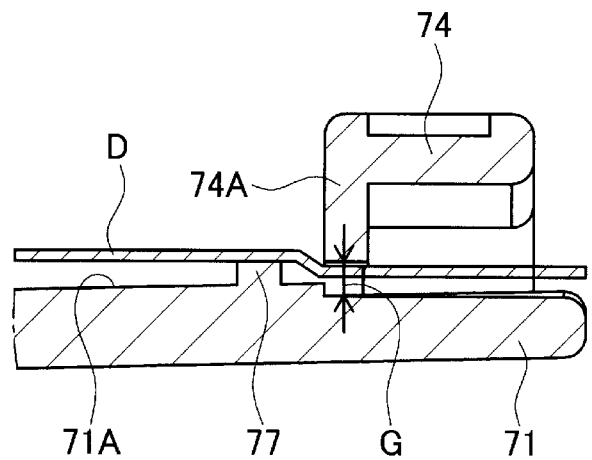
FIG. 5 is a cross-sectional view of an area including a first claw in the MFP according to the embodiment of the present invention.
Figure 6:
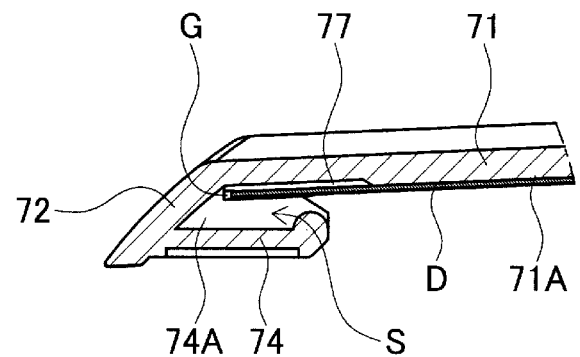
FIG. 6 is another cross-sectional view of the area surrounding a first slide-engaging claw in the MFP according to the embodiment of the present invention.

The first slide-engaging claw 74 is formed to have a sheet holding rib 74A, which extends along the facing surface 71A (see FIGS. 5 and 6). FIG. 5 shows a cross-section of the first slide-engaging claw 74 and the projection 77 on the top cover 70, taken along the line A-A in FIG. 4. The first slide-engaging claw 74 is formed to have the sheet holding rib 74A in a position and a shape to create a clearance G, which is open on the right side and closed on the left side, along with the facing surface 71A (see FIGS. 8 and 9). In the clearance G formed in between the sheet holding rib 74A and the facing surface 71A, a left-side end of the ornamental sheet D can be inserted. Thus, the ornamental sheet D can be held in the intervening position between the facing surface 71A and the sheet holding rib 74A along the facing surface 71A with the left-side end thereof being inserted in the clearance G.

Meanwhile, the projection 77 is formed in the position along the sheet holding rib 77A of the first claw 73 on the facing surface 71A (see FIGS. 5 and 6). In particular, the projection 77 is formed to protrude downward (when the top cover 70 is attached to the upper cover 45) in a position to be spaced apart for a predetermined amount from the sheet holding rib 74A along a plane, which is in parallel with the facing surface 71A. In the meantime, the projection 77 is extended downwardly (i.e., along an orthogonal direction with respect to the facing surface 71A) to have an open end (i.e., a lower end) thereof to reach a lower position, which is vertically spaced apart further from the facing surface 71A, than an upper end of the sheet holding rib 74A, when the top cover 70 is attached to the upper cover 45. In other words, when viewed along the direction of depth (i.e., the front-rear direction), the projection 77 and the sheet holding rib 74A partially overlap each other horizontally. Therefore, when the ornamental sheet D is being inserted in the clearance G between the sheet holding rib 74A and the facing surface 71A, the ornamental sheet D is forwarded along the facing surface 71A passing by the lower open end of the projection 77, through the space between the projection 77 and the sheet holding rib 74A, and by the upper end of the sheet holding rib 74A, with the left-side edge of the ornamental sheet D being deformed by the lower end of the projection 77 and the upper end of the sheet holding rib 74A (see FIG. 5). When thus the ornamental sheet D is inserted in the clearance G, with the resilient nature thereof, the ornamental sheet D is urged against the lower end of the projection 77 and the upper end of the sheet holding rib 74A. Therefore, the ornamental sheet D can be held in position on the first top cover 70 more steadily by the cooperation of the projection 77 and the sheet holding rib 74A.

The first slide-engaging claw 74 is formed in a spaced-apart position from the facing surface 71A to have an interspace S for the first engageable edge 48A (see FIG. 6). The interspace S is an allowance space, in which the first engageable edge 48A of the first engageable hole 48 is allowed to be inserted when the first top cover 70 is attached to first top cover attachable surface 46. With the interspace S for the first engageable edge 48A, the first slide-engaging claw 74 is formed in the position such that a distance between the upper end of the sheet holding rib 74A and the facing surface 71A is nearly equivalent to or slightly larger than a thickness (height) of the first engageable edge 48A. Therefore, even with the ornamental sheet D held in the first slide-engaging claw 74, the first engageable edge 48A can be inserted in the interspace S for the first engageable edge 48A (see FIGS. 8 and 9). Accordingly, the first top cover 70 can be attached to the upper cover 45 on the first top cover attachable surface 46 with the ornamental sheet D held along the facing surface 71A.

Thus, the first claws 73 and the first slide-engaging claws 74 hold the ornamental sheet D, by having the lateral ends of the ornamental sheet D inserted in the clearances G, along the facing surface 71A of the plane section 71 in the first top cover 70. Accordingly, an image appearing on the ornamental sheet D is visible to the user through the first top cover 70 made of clear resin. The ornamental sheet D may be replaced with a new ornamental sheet D according to the user's preference when the first top cover 70 is detached from the first top cover attachable surface 46 of the upper cover 45.

Further, the ornamental sheet D can be inserted in the clearances G to reach the widthwise ends of the plane section 71. Therefore, the entire area in the plane section 71 can hold the ornamental sheet D, and the ornamental sheet D in a maximum allowable size, which is equivalent to the area of the plane section 71, can be fully enjoyed in the MFP 1 without being damaged or cut for attaching means such as screws and screw holes.

Moreover, in the MFP 1 described above, the ornamental sheet D can be held along the facing surface 71A in the position under the plane section 71 and over the first claws 73 and the first slide-engaging claws 74 (see FIGS. 2, 5-9). Therefore, the first claws 73 and the first slide-engaging claws 74 are covered unexposed by the ornamental sheet D, and appearance of the MFP 1 with the ornamental sheet D may be improved. Furthermore, the ornamental sheet D can cover the first slider holes 47 and the first engageable holes 48 unexposed, and the appearance of the MFP 1 may be even more improved.

Next, attachable and detachable structure of the first top cover 70 to and from the first top cover attachable surface 46 of the upper cover 45 will be described.

Firstly, the upper cover 45 and the first top cover 70, when the upper cover 45 with the first top cover 70 attached thereto is in the closed position, will be described. When the first top cover 70 is attached to the first top cover attachable surface 46 of the upper cover 45, the first slider holes 47 are engaged with the first claws 73, and the first engageable holes 48 are engaged with the first slide-engaging claws 74. Meanwhile, when the first top cover 70 is detached from the upper cover 45, the user slidably moves the first top cover 70 toward the pivot axis 49, i.e., leftward in FIGS. 8 and 9. In the present embodiment, the direction to slidably move the first top cover 70, i.e., leftward, will be referred to as a first detaching direction. On the other hand, a direction opposite from the first detaching direction, i.e., rightward, will be referred to as a first attaching direction hereinbelow.

In the present embodiment, the conveyer housing 40 is formed to have two (2) slide-restricting pieces 41 in positions along a right-side end of the conveyer housing 40. Each slide-restricting piece 41 can restrict the first top cover 70 from being moved for an excessive amount. The slide-restricting piece 41 is arranged in a position, in which a distance between the slide-restricting piece 41 and the pivot axis 49 is substantially shorter than a distance between the right-side end of the upper cover 45 and the pivot axis 49. In other words, the slide-restricting piece 41 is in a position closer to the pivot axis 49 than the right-side end of the upper cover 45. Therefore, when the upper cover 45 with the first top cover 70 attached thereto is in the closed position, the first claws 73 of the first top cover 70 are placed in positions to penetrate the first slider holes 47 and in the vicinities of the slide-restricting pieces 41 respectively. In this regard, the slide-restricting pieces 41 are in leftward positions closer to the pivot axis 49 with respect to the first claws 73 (see FIG. 8).

Further, each slide-restricting piece 41 is arranged in an upright posture in a position lower than the first top cover attachable surface 46. Therefore, with the first top cover 70 attached thereto, when the upper cover 45 is in the closed position, an upper edge of the slide-restricting piece 41 is in an upper position with respect to a lower end of the first claw 73, which penetrates the first slider hole 47. Accordingly, even if the upper cover 45 with the first top cover 70 is attempted to be moved in the first detaching direction, the first top cover 70 is caught by the slide-restricting pieces 41 at the first claws 73, and the first top cover 70 along with the upper cover 45 is restricted from being moved further in the first detaching direction. In other words, the slide-restricting piece 41 restricts a slidable amount for the first top cover 70, and within the restricted slidable amount, the first slide-engaging claws 74 and the first engageable holes 48 are not allowed to be disengaged from each other. Thus, when the upper cover 45 is in the closed position, the first top cover 70 is restricted from being detached from the first top cover attachable surface 46 (see FIG. 8).

Secondly, the upper cover 45 and the first top cover 70, when the upper cover 45 with the first top cover 70 attached thereto is in the open position, will be described. When the upper cover is open (see FIG. 9), the first claw 73 moves upward along with rotation of the upper cover 45 to be separated apart from the slide-restricting piece 41 formed in the conveyer housing 40. When in the upward position separated from the slide-restricting piece 41, the first claw 73 is released from the restriction of the slide-restricting piece 41, and the slide-restricting piece 41 is no longer in a track of the first claw 73 when the first top cover 70 is moved in the first detaching direction. That is, when the upper cover 45 is in open, the first top cover 70 is allowed to slidably move in the first detaching direction, and the first slide-engaging claw 74 and the first engageable hole 48 can be disengaged from each other. Therefore, the first top cover 70 can be detached from the first top cover attachable surface 46 of the upper cover 45.

Thus, when the sheet conveyer unit 60 is in the usable condition, with the upper cover 45 being in the closed position, the first claws 73 and the slide-restricting pieces 41 restrict the first top cover 70 from being detached from the first top cover attachable surface 46. Therefore, the first top cover 70 can be prevented from being undesirably removed from the upper cover 45 even when, for example, the user accidentally or unintentionally moves the first top cover 70.

Meanwhile, when the upper cover 45 is open, the first slide-engaging claws 74 and the first engageable holes 48 can be disengaged from each other as the first top cover 70 is slidably moved in the first detaching direction. Therefore, by the actions including opening the upper cover 45 upward and slidably moving the first top cover 70 in the first detaching direction, which are less complicated than, for example, unscrewing, the first top cover 70 can be removed from the upper cover 45.

Next, the second top cover 80 will be described hereinbelow. The second top cover 80 is made of a clear and colorless resin and forms a right-side section in a top plane of the sheet cover unit 25. The second top cover 80 is detachably attached to the second top cover attachable surface 50 on the sheet cover housing 26 in the sheet cover unit 25. The second top cover attachable surface 50 is formed to have second slider holes (not shown) in left-side corners on the second top cover attachable surface 50 respectively. The second slider holes are in a form similar to the first slider holes 47 in the first top cover attachable surface 46. When the second top cover 80 is attached to the second top cover attachable surface 50, second claws 83 penetrate the second slider holes respectively. Further, second engageable holes (not shown) are formed in right-side corners on the second top cover attachable surface 50 respectively. The second engageable holes are in a form similar to the first engageable holes 48 in the first top cover attachable surface 46. When the second top cover 80 is attached to the second top cover attachable surface 50, the second engageable holes are engaged with second slide-engaging claws 84 (see FIG. 10), which are formed on the second top cover 80. When the second top cover 80 is attached to the second top cover attachable surface 50 via the second slider holes and the second claws 83, and via the second engageable holes and the second slide-engaging claws 84, the second top cover 80 can hold an ornamental sheet D in a position between the second top cover attachable surface 50 and a facing (lower) surface 81A of the plane section 81.

Figure 10:
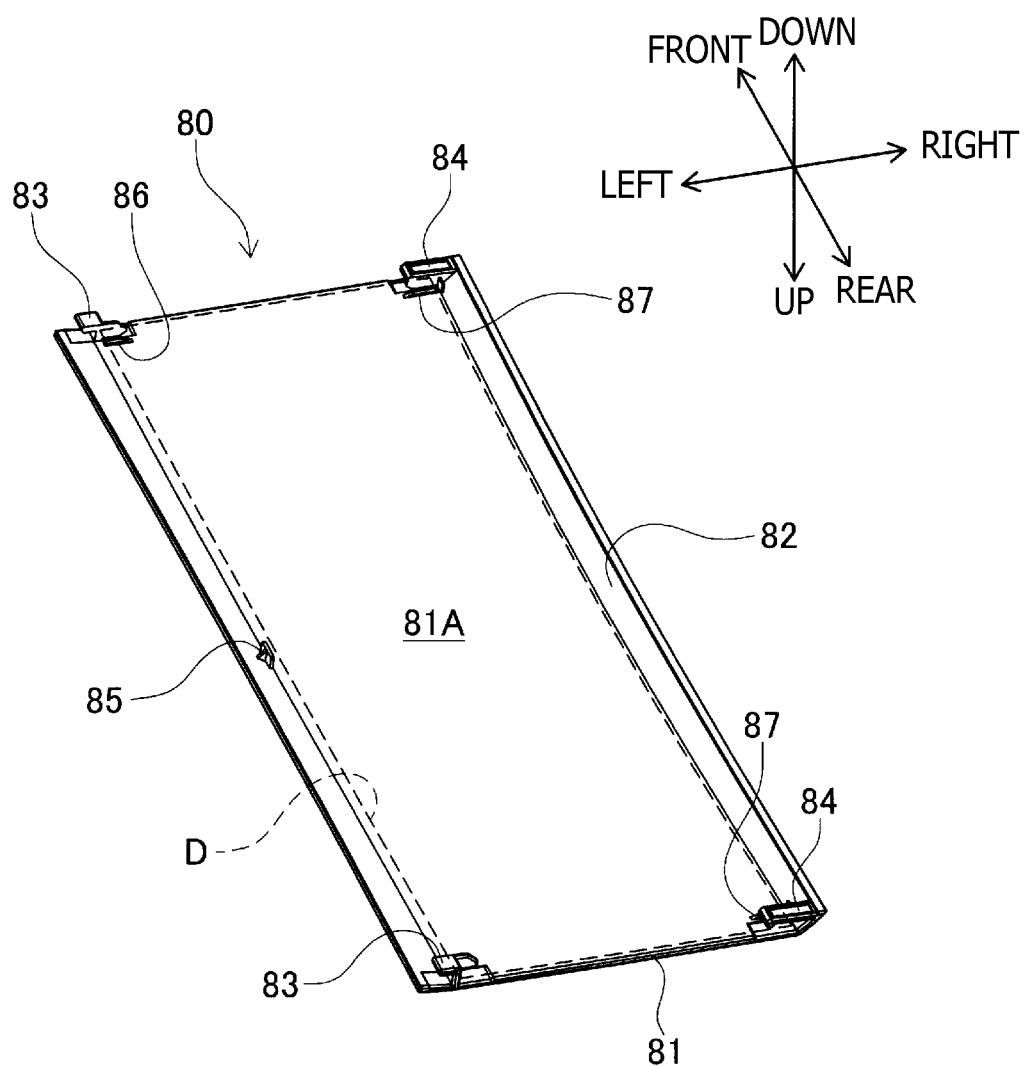
FIG. 10 is a perspective view of a second top cover in the MFP according to the embodiment of the present invention.

The second top cover 80 is formed to have a plane section 81, a lateral face 82, the second claws 83, the second slide-engaging claws 84, and a locking piece 85 (see FIG. 10). The plane section 81 is formed in a shape, which is substantially similar and equivalent in size to the second top cover attachable surface 50. The plane section 81 has the facing surface 81A, which can face the second top cover attachable surface 50 when the second top cover 80 is attached to the second top cover attachable surface 50 (when the ornamental sheet D is placed in position, via the ornamental sheet D). The lateral face 82 extends from a right-side end of the plane section 81 down-and-rightward. The ornamental sheet D can be held on the facing surface 81A by the second claws 83 and the second slide-engaging claws 84 along the facing surface 81A. On the facing surface 81A of the second top cover 80, a projection 86 projecting downward (toward the second top cover attachable surface 50 when the second top cover 80 is attached to the top cover attachable surface 50) is formed in a position to align each second claw 83 (see FIG. 10). Further, a projection 87 projecting downward (toward the second top cover attachable surface 50 when the second top cover 80 is attached to the second top cover attachable surface 50) is formed in a position to align each second slide-engaging claw 84 (see FIG. 10).

The second claws 83 are formed to protrude downward, when the second top cover 80 is attached in position, at the left-side corners on the plane section 81. Each of the second claw 83 is in a configuration similar to the first claw 73 and is slidably inserted in the second slider hole along the longer sides of the second slider hole to penetrate the second top cover attachable surface 50. Thus, the second claw 83 can removably hold the second top cover 80 in the predetermined position on the second top cover attachable surface 50 in cooperation with the second slider hole formed in the second top cover attachable surface 50.

The second claw 83 is formed to have a sheet holding rib (not shown), which extends along the facing surface 81A. In particular, the second claw 83 is formed to have the sheet holding rib in a position and a shape to create a clearance G, which is open on the right side and closed on the left side, in between the sheet holding rib and the facing surface 81A. In the clearance G, a left-side end of the ornamental sheet D can be inserted. Thus, the ornamental sheet D can be held in the position between the facing surface 81A and the sheet holding rib along the facing surface 81A with the left-side end thereof being inserted in the clearance G.

Meanwhile, the projection 86 is formed in the position along the sheet holding rib of the second claw 83 on the facing surface 81A. In particular, the projection 76 is formed to protrude downward (when the second top cover 80 is attached to the second top cover attachable surface 50) in a position to be spaced apart for a predetermined amount from the sheet holding rib along a plane, which is in parallel with the facing surface 81A, similarly to the projection 76 with respect to the facing surface 71A (see FIG. 7). Therefore, when the ornamental sheet D is inserted in the clearance G between the sheet holding rib and the facing surface 81A, the ornamental sheet D can be held in the position on the second top cover 80 more steadily by the cooperation of the projection 86 and the sheet holding rib.

The second slide-engaging claws 84 are formed in a front end position and a rear end position respectively on the lateral face 82. Each of the second slide-engaging claws 84 is formed to extend leftward from the lateral face 82 along the plane section 81. When the second top cover 80 is attached in position, the second slide-engaging claw 84 is inserted in the second engageable hole along with the sliding movement of the second top cover 80. When the second top cover 80 is moved to a predetermined position, the second slide-engaging claw 84 is engaged with the second engageable hole, and the second top cover 80 is detachably attached to the sheet cover housing 26 on the second top cover attachable surface 50.

The second slide-engaging claw 84 is formed to have a sheet holding rib (not shown), which extends along the facing surface 81A, similarly to the first slide-engaging claw 74. The second slide-engaging claw 84 is formed to have the sheet holding rib in a position and a shape to create a clearance G, which is open on the left side and closed on the right side, in between the sheet holding rib and the facing surface 81A. In the clearance G, a right-side end of the ornamental sheet D can be inserted. Thus, the ornamental sheet D can be held in the position between the facing surface 81A and the sheet holding rib along the facing surface 81A with the right-side end thereof being inserted in the clearance G.

Meanwhile, the projection 87 is formed in the position along the sheet holding rib of the second slide-engaging claw 84 on the facing surface 81A. In particular, the projection 87 is formed to protrude downward (when the top cover 70 is attached to the sheet cover housing 26) in a position to be spaced apart for a predetermined amount from the sheet holding rib along a plane, which is in parallel with the facing surface 81A, similarly to the projection 76 with respect to the facing surface 71A (see FIGS. 5 and 6). Therefore, when the ornamental sheet D is inserted in the clearance G between the sheet holding rib and the facing surface 81A, the ornamental sheet D can be held in the position on the second top cover 80 more steadily by the cooperation of the projection 87 and the sheet holding rib.

The second slide-engaging claw 84, similarly to the first slide-engaging claw 74 (see FIG. 6), is formed in a spaced-apart position from the facing surface 81A to have an interspace (not shown) for a second engageable edge (not shown), which is similar to the first engageable edge 48A of the first engageable hole 48. The interspace is an allowance space, in which the second engageable edge of the second engageable hole is allowed to be inserted when the second top cover 80 is attached to second top cover attachable surface 50. With the interspace for the second engageable edge, the second slide-engaging claw 84 is formed in the position such that a distance between the upper end of the sheet holding rib and the facing surface 81A is nearly equivalent to or slightly larger than a thickness (height) of the second engageable edge. Therefore, even with the ornamental sheet D held in the second slide-engaging claw 84, the second engageable edge can be inserted in the interspace (see also FIGS. 8 and 9). Accordingly, the second top cover 80 can be attached to the sheet cover housing 26 on the second top cover attachable surface 50 with the ornamental sheet D held along the facing surface 81A.

In the present embodiment, in terms of attachment and detachment of the second top cover 80 to and from the second top cover attachable surface 50 of the sheet cover housing 26, a direction to slidably move the second top cover 80, i.e., rightward, will be referred to as a second detaching direction. On the other hand, a direction opposite from the second detaching direction, i.e., leftward, will be referred to as a second attaching direction hereinbelow.

The second claws 83 and the second slide-engaging claws 84 can hold the ornamental sheet D, by having the lateral ends of the ornamental sheet D inserted in the clearances G, along the facing surface 81A of the plane section 81 in the second top cover 80. Accordingly, an image appearing on the ornamental sheet D is visible to the user through the second top cover 80 made of clear resin. The ornamental sheet D may be replaced with a new ornamental sheet D according to the user's preference when the second top cover 80 is detached from the second top cover attachable surface 50 of the sheet cover housing 26.

Further, the ornamental sheet D can be inserted in the clearances G to reach the widthwise ends of the plane section 81. Therefore, the entire plane in the plane section 81 can hold the ornamental sheet D, and the ornamental sheet D in a maximum allowable size, which is equivalent to the size of the plane section 81, can be fully enjoyed in the MFP 1 without being damaged or cut for an attaching means such as screws and screw holes.

Moreover, in the MFP 1 described above, the ornamental sheet D can be held along the facing surface 81A in the position under the plane section 81 and over the second claws 83 and the second slide-engaging claws 84 (see FIGS. 2, 11, and 12). Therefore, the second claws 83 and the second slide-engaging claws 84 are covered unexposed by the ornamental sheet D, and appearance of the MFP 1 with the ornamental sheet D may be improved.

The locking piece 85 is formed in a depth-central position along the front-rear direction on the left-side edge on the facing surface 81A of the second top cover 80 to protrude toward the second top cover attachable surface 50 when the second top cover 80 is attached to the second top cover attachable surface 50. When the second top cover 80 is in position, the locking piece 85 restricts the second top cover 80 from being moved for an excessive amount in the second detaching direction in cooperation with a slide-restricting claw 51, which is formed in the second top cover attachable surface 50.

The slide-restricting claw 51 is formed to have a stepped dent (unsigned), which is lowered in a step, and a claw (unsigned), which is bent upward from a left-side edge of the dent, in a depth-central position along the front-rear direction on the left-side edge on the second top cover attachable surface 50 (see FIGS. 11 and 12). When the second top cover 80 is attached to the second top cover attachable surface 50, the slide-restricting claw 51 is in a downstream position with respect to the locking piece 85 in the second top cover 80 along the second detaching direction. When the second top cover 80 is in position, the left-side end of the slide-restricting claw 51 is in contact with a part of a plane of the locking piece 85, which is on the downstream side along the second detaching direction. In other words, the second top cover 80 is restricted from being moved further beyond the slide-restricting claw 51 in the second detaching direction. Thus, the slide-restricting piece 51 restricts a slidable amount for the second top cover 80, and the second top cover 80 is not allowed to be detached from the second top cover attachable surface 50 solely by the sliding motion in the second detaching direction.

Next, attachable and detachable structure of the second top cover 80 to and from the second top cover attachable surface 50 of the sheet cover housing 26 will be described. When the second top cover 80 is allowed to be detached, it is necessary that the second top cover 80 is slidable in the second detaching direction further from the slide-restricting claw 51 (see FIG. 11). In other words, it is required that the locking piece 85 in the second top cover 80 is separated from the slide-restricting claw 51. Therefore, the left-side edge of the second top cover 80, which is an edge adjoining the cover tray 30, is required to be uplifted.

Meanwhile, the cover tray 30 is in the leftward and adjacent position of the second top cover 80 (see FIG. 1). When the cover tray 30 is in the closed position (see FIGS. 1 and 11), therefore, the cover tray 30 prevents the user from accessing the left-side edge of the second top cover 80. Therefore, when the cover tray 30 is in the closed position, the second top cover 80 is restricted from being moved in the second detaching direction beyond the slide-restricting claw 51 due to the interlocking cooperation of the locking piece 85 and the slide-restricting claw 51. As a consequent, the second top cover 80 can be prevented from being undesirably removed from the sheet cover housing 26 even when, for example, the user accidentally or unintentionally touches the second top cover 80.

When the user rotates the cover tray 30 about the tray shaft 31 to place the cover tray 30 in a predetermined position, such as an upright position as shown in FIG. 12, the concave section 37 is exposed and communicated with the exterior atmosphere. Therefore, the left-side edge of the second top cover 80 is exposed, and the user can access the left-side edge of the second top cover 80 and uplift the second top cover 80.

When the left-side edge of the second top cover 80 is uplifted, the locking piece 85 in the second top cover 80 comes in an upper position with respect to the slide-restricting claw 51 in the second top cover attachable surface 50. In this regard, the locking piece 85 is formed in the center of the depth on the left-side edge of the second top cover 80, which is a most deformable position within the depth of the left-side edge of the second top cover 80 by the uplifting force from the user. Therefore, the locking piece 85 can be released from the effect of the slide-restricting claw 51 and moved to the upper position easily without being subject to excessive amount of deforming force or without being separated forcibly. Once the locking piece 85 is released from the slide-restricting claw 51, the second top cover 80 can be slidably moved in the second detaching direction beyond the slide-restricting claw 51, and the second top cover 80 can be removed from the second top cover attachable surface 50.

Thus, the locking piece 85 and the slide-restricting claw 51 restrict the second top cover 80 from being slidably moved beyond a predetermined amount. Therefore, the second top cover 80 can be prevented from being undesirably removed from the sheet cover housing 26 even when, for example, the user accidentally or unintentionally moves the second top cover 80.

Meanwhile, in order for the second top cover 80 to be slidably moved in the second detaching direction beyond the predetermined amount, the left-side edge of the second top cover 80 is uplifted. When the left-side edge of the second top cover 80 is uplifted, the second slide-engaging claws 84 and the second engageable holes are disengaged from each other, and the second top cover 80 is allowed to be removed from the second top cover attachable surface 50.

In order for the left-side edge of the second top cover 80 to be uplifted, upward lifting force needs to be applied to a lower side of the left-side edge of the second top cover 80. Therefore, the cover tray 30 is rotated for the predetermined amount to expose the concave section 37, which is adjacent to the left-side edge of the second top cover 80, and the user is allowed to access the left-side edge of the second top cover 80 to apply the uplifting force to the left-side edge of the second top cover 80. Thus, by the actions including rotating the cover tray 30 for the predetermined amount, uplifting the left-side edge of the second top cover 80, and moving the second top cover 80 slidably in the second detaching direction, which are less complicated than, for example, unscrewing, the second top cover 80 can be removed from the sheet cover housing 26.

Although an example of carrying out the invention has been described, those skilled in the art will appreciate that there are numerous variations and permutations of the sheet conveyer device that falls within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, the sheet conveyer device with the replaceable top cover as described above may not necessarily be applied to the MFP 1, which has the functions of scanning, copying, printing, and facsimile transmission. Rather, the sheet conveyer device may be applied to any other apparatuses, as long as the apparatuses are equipped with the auto document feeders (ADF).

For another example, the first top cover 70 and the second top cover 80 may not necessarily be made of a clear colorless resin but may be made of a clear but colored resin, as long as the first top cover 70 and the second top cover 80 are substantially transparent and visibility of the ornamental sheet D placed underneath the first top cover 70 and the second top cover 80 is secured. Further, the first top cover 70 and the second top cover 80 may not necessarily be uniformly transparent and colorless. As long as transparency in the plane sections 71, 81 is secured, the remaining sections in the first top cover 70 and the second top cover 80 may not necessarily be transparent but may be opaque.

What is claimed is:

1. A sheet conveyer device, comprising:
a main housing configured to accommodate a sheet conveyer unit, the sheet conveyer unit being configured to convey a sheet along a predetermined conveyer path; and
a cover member, which is formed to have a plane section; is configured to be detachably attached to the main housing with a predetermined facing surface of the plane section set to face a predetermined plane of the main housing; and is configured to have an ornamental sheet detachably attached in an intervening position between the predetermined plane of the main housing and the cover member;
wherein the cover member includes an engaging piece, which is formed on a same side as the predetermined facing surface of the plane section, when the cover member is attached to the main housing, and is configured to be engageable with an engageable section formed on the predetermined plane of the main housing; and
wherein the engaging piece is formed to have a sheet holding rib, which is configured to form a clearance in between the predetermined facing surface of the plane section and the sheet holding rib and is configured to hold a lateral end of the ornamental sheet in the clearance.

2. The sheet conveyer device according to claim 1,
wherein the cover member includes a lateral section, which is configured to extend from an end portion of the plane section in a direction to be distanced from the predetermined facing surface of the plane section;
wherein the engaging piece extends from the lateral section along the plane section with a predetermined amount of distance maintained from the plane section; and
wherein the clearance between the sheet holding rib and the predetermined facing surface of the plane section is open on a side opposite from the lateral section.

3. The sheet conveyer device according to claim 1,
wherein the engageable section includes an engageable piece, which is formed to extend along the predetermined plane of the main housing to be engaged with the engaging piece of the cover member, and a movable space, which is formed in an inner side of the main housing with respect to the engageable piece, and in which the engaging piece of the cover member is movable.

4. The sheet conveyer device according to claim 1,
wherein the cover member includes a projection, which is formed to project from the predetermined facing surface of the plane section;
wherein the projection is formed in a position to be spaced apart from the sheet holding rib along the predetermined facing surface for a predetermined amount of space, in which the ornamental sheet can be inserted; and
wherein an open end of the projection is in a position spaced apart further from the predetermined facing surface than an open end of the sheet holding rib along an orthogonal direction with respect to the predetermined facing surface.

5. The sheet conveyer device according to claim 1,
wherein the cover member is formed to have an interspace, in which the engageable section formed in the main housing is to enter even when the ornamental sheet is held by the cover member in the clearance between the predetermined facing surface of the plane section and the sheet holding rib.

6. The sheet conveyer device according to claim 1,
wherein, at least in the plane section, the cover member is made of a transparent material.

7. An image processing apparatus, comprising:
an image processing unit; and
a sheet conveyer device,
wherein the sheet conveyer device comprises:
a main housing configured to accommodate a sheet conveyer unit, which is configured to convey a sheet along a predetermined conveyer path; and
a cover member, which is formed to have a plane section; is configured to be detachably attached to the main housing with a predetermined facing surface of the plane section set to face a predetermined plane of the main housing; and is configured to have an ornamental sheet detachably attached in an intervening position between the predetermined plane of the main housing and the cover member;
wherein the cover member includes an engaging piece, which is formed on a same side as the predetermined facing surface of the plane section, when the cover member is attached to the main housing, and is configured to be engageable with an engageable section formed on the predetermined plane of the main housing; and
wherein the engaging piece is formed to have a sheet holding rib, which is configured to form a clearance in between the predetermined facing surface of the plane section and the sheet holding rib and is configured to hold an end portion of the ornamental sheet in the clearance.

* * * * *